(No Model.)
O. ZWIETUSCH.
METHOD OF IMPREGNATING BEER, &c., WITH CARBONIC ACID GAS AND APPARATUS THEREFOR.
No. 485,362. Patented Nov. 1, 1892.
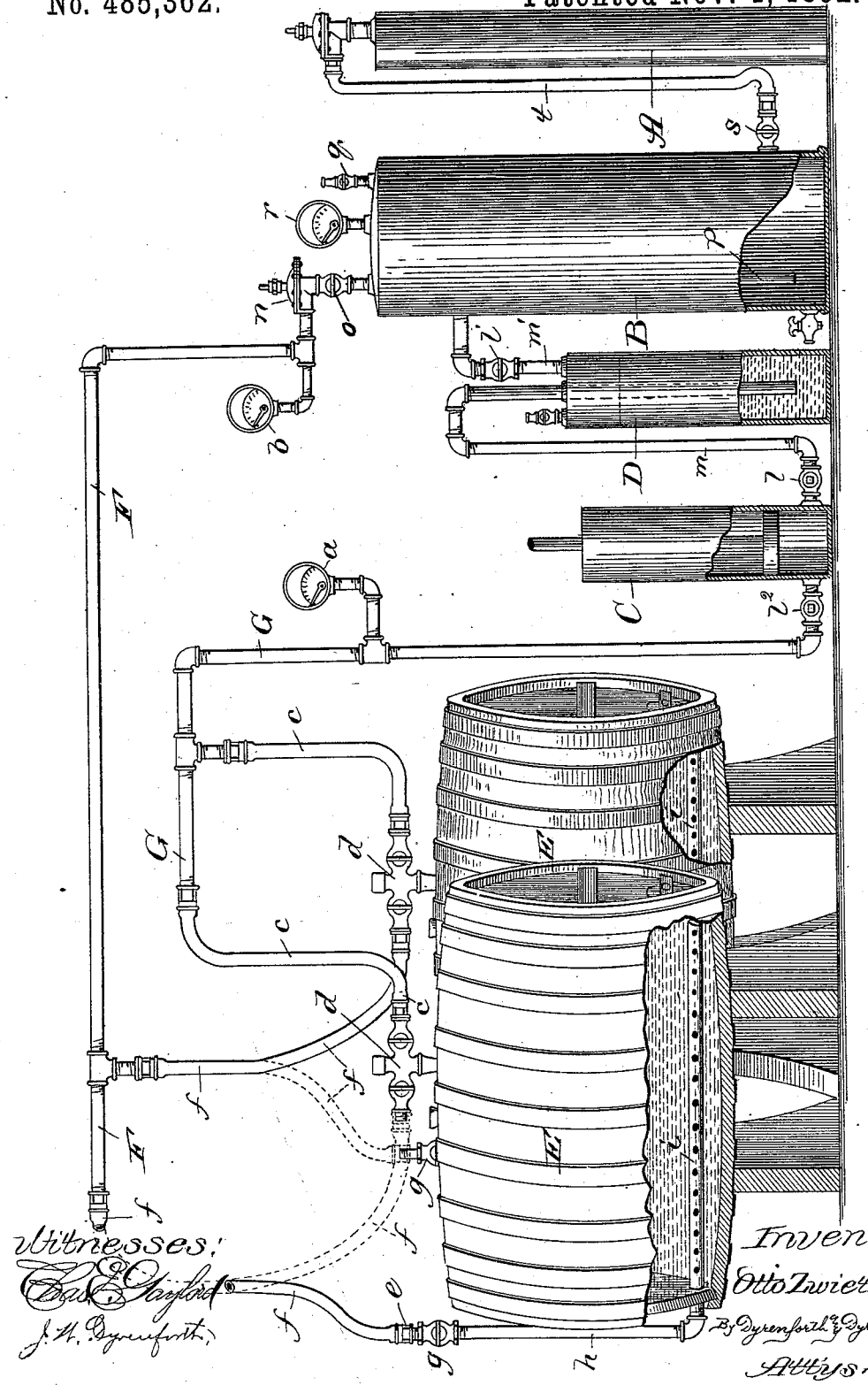
Witnesses:
Chas. B. Gaylord
J. H. Dyrenforth
Inventor
Otto Zwietusch
By Dyrenforth & Dyrenforth,
Attys.

UNITED STATES PATENT OFFICE.

OTTO ZWIETUSCH, OF MILWAUKEE, WISCONSIN.

METHOD OF IMPREGNATING BEER, &c., WITH CARBONIC-ACID GAS AND APPARATUS THEREFOR.

SPECIFICATION forming part of Letters Patent No. 485,362, dated November 1, 1892.

Application filed December 10, 1889. Serial No. 333,238. (No model.)

*To all whom it may concern:*

Be it known that I, OTTO ZWIETUSCH, a citizen of the United States, residing at Milwaukee, in the county of Milwaukee and State of Wisconsin, have invented a new and useful Method of Impregnating Beer and other Liquids with Carbonic-Acid Gas and Apparatus Therefor, of which the following is a specification.

My invention is chiefly useful in the manufacture of beer, and I shall describe it with relation to that beverage alone, since this will serve as a sufficient guide for its application to other liquids.

In the treatment of lager-beer after the main fermentation as commonly practiced the beer is stored in the ruh-casks to settle the yeast that remains. Then it is transferred to the chip-casks, and young or kraeusen beer is added to excite an after fermentation, and thus by generating carbonic-acid gas give to the beer the required effervescence.

The objects of my present invention are to give to beer the required quantity of carbonic-acid gas without the use of kraeusen-beer, and generally to effect the carbonating of liquids more speedily and in a better manner than has been done heretofore.

My method relates to injecting carbonic-acid gas derived from an extraneous source into the lower part of the liquid and exhausting from above the liquid-injected carbonic-acid gas to a pressure lower than the impelling-pressure, whereby a current of carbonic-acid gas is caused to flow through the liquid, and the required impregnation is effected by the retention in the liquid of a portion of the flowing carbonic-acid gas.

It consists in creating a circuit of the carbonic-acid gas which is forced through the liquid, so that the gas which is exhaused above the liquid shall be reinjected at the base recurrently with additional extraneous carbonic-acid gas until the required degree of impregnation is attained; and it consists, further, in the case of beer especially, in supplementing the operation defined above by stopping the injection and exhaust and substituting for the latter a constant pressure of carbonic-acid gas upon the surface of the beer.

Fermented beer, which is to be subjected to my process, is to be taken after it has passed the ruh stage or after it has been subjected to one of the methods which form a substitute for the aging effect of the ruh stage—such as either the so-called "vacuum process" or a process of filtration after the main fermentation. Unfermented beer—such as the beverage known as "New Era" beer—should be subjected to my process of impregnation directly after the cooling.

For the purpose of carrying out my process in the most effective manner I have devised novel apparatus, illustrated in the accompanying drawings in sectional elevation, a description of which is as follows.

A is a gas generator or cylinder containing liquefied carbonic-acid gas.

B is a gas-reservoir filled from the generator A through the pipe $t$ and cock $s$, and when it has been filled the cock is to be closed. Surmounting the reservoir B is a pressure-gage $r$ and also a vent-cock $q$, and extending up from near the bottom of the reservoir B through its top is a pipe $p$, provided above the reservoir with a valve $o$ and provided, also, with a pressure-regulator $n$ between the valve $o$ and the leading pipe, which conducts the gas to the beer.

C is a pump connected through a pipe $m$, having a valve $l$, with a washer D, which in turn is connected through a pipe $m'$ and valve $l'$ with the reservoir B.

E E are vessels for the beer, which are provided internally just over their bases with perforated pipes $i$.

F is the leading-pipe; $h$, a section of connecting-pipe having a valve $g$, and $f$ a section of flexible pipe having a valve $e$. The sections when coupled together, and also to the pipes F and $i$, establish communication between the reservoir B and the base of the vessel.

G is a pipe leading to the pump C and provided with a valve $l^2$, and $c$ $c$ are hose connections between the pipe G and double-branch faucets $d$, one of which is upon the top of each cask. The pipe F is provided with a pressure-gage $b$ and the pipe G with a pressure-gage $a$.

The operation is as follows: A vessel E having been filled nearly full of the beer to be carbonated, the valves are opened to cause a flow of gas from the reservoir B through the regulating-valve $n$ and pipes F, $h$, and $i$ into the base of the liquid, all the outlets of the vessel being at first closed. The impelling-pressure is a steady one of, say, ten pounds, maintained by the regulating-valve *n*. After the vessel E, which contains the beer under treatment, has been charged up to this pressure the pump C is set in operation with the proper communications opened to exhaust gas from above the beer in the vessel E through the faucet *d*, hose *c*, and pipe G. The exhaust should be regulated to a pressure somewhat less than the impelling-pressure. For example, when the impelling-pressure is about ten pounds the exhaust-pressure may be about six pounds. The gas withdrawn from over the beer is passed from the pump through the gas-purifier D back into the gas-reservoir B, from which it is again passed over into the base of the beer, so that the gas traverses a continuous circuit and waste is avoided. The operation may be suspended from time to time. It will be obvious that by reason of the reduced pressure above the beer a rapid flow of gas through the liquid is caused, whereby the carbonating is effected much more rapidly than would be the case if no exhaust were provided. Throughout the operation care should be taken not to have the difference between the exhaust and impelling pressures too great. The reservoir B must at all times be supplied with carbonic-acid gas up to the established pressure, which may be ten pounds or as many pounds as may be found suitable. If desired, additional connections of the nature described may be provided, whereby beer in the separate vessels may be acted upon simultaneously by one reservoir and one pump. When the beer has been sufficiently carbonated, which will require several days for a large quantity, the pipe *f* is to be disconnected from the valve *e* (which is previously closed) and connected to the double-branch faucet *d*, and communication with the pipe G is shut off, so that the beer is maintained thereafter under a uniform pressure of about ten pounds of carbonic-acid gas exerted upon its surface, which hastens the clarification by causing suspended particles to settle to the bottom of the vessel. In this condition it may be allowed to remain until it is to be racked off through a filter or otherwise, though, if preferred, the vessels may be connected to the usual bunging apparatus.

My method of carbonating described above not only saves time in the manufacture of beer, but it also gives an improved product, since, while it imparts to the beverage all the required life and effervescence, it avoids the deteriorating effects of kraeusen or other fermentative substances, all of which, when added to beer, tend, more or less, to deprive it of the desirable qualities which it had previously acquired by the aging process.

What I claim as new, and desire to secure by Letters Patent, is—

1. The method of impregnating with carbonic-acid gas uncharged or inadequately-charged beer or other liquid, which consists in holding the liquid to be carbonated in a closed vessel, injecting extraneous carbonic-acid gas into the lower part of the liquid, exhausting injected carbonic-acid gas from above the liquid to a pressure lower than the injecting pressure, reinjecting the exhaust carbonic-acid gas, together with additional extraneous carbonic-acid gas, into the lower part of the liquid, and continuing the circulation until the desired degree of impregnation is obtained, substantially as described.

2. The method of carbonating and keeping beer or other liquid, which consists in holding the liquid in a closed vessel, injecting extraneous carbonic-acid gas into the lower part of the liquid, exhausting injected carbonic-acid gas from above the liquid to a pressure lower than the injecting pressure, reinjecting the exhaust carbonic-acid gas, together with additional extraneous carbonic-acid gas, into the lower part of the liquid, and continuing the circulation until the liquid is sufficiently impregnated, then stopping the injection and exhaust and substituting for the latter a constant pressure upon the surface of the liquid, substantially as described.

3. In combination with a vessel E, having an internal perforated pipe *i* at or near its base, and with a double-branch faucet *d* at its top, a pipe *h*, communicating through the vessel with the perforated pipe *i* and provided with a valve *g*, a carbonic-acid-gas reservoir B, surmounted by a pressure-regulating valve *n*, a pipe F, leading from the pressure-regulating valve *n*, a flexible pipe *f*, having a valve *e*, for connecting the pipe F with the pipe *n* or the faucet *d*, as may be required, an exhaust-pump C, and a pipe G *c*, having valves and connecting the pump C with the faucet *d*, substantially as described.

4. In combination with a vessel for containing liquid, a carbonic-acid-gas reservoir, a gas-conduit leading from the gas-reservoir into the base of the vessel, an exhaust-pump, a gas-conduit leading from the top of the vessel to the exhaust-pump, and a gas-conduit leading from the discharge side of the pump into the gas-reservoir, the conduits having valves, substantially as described.

5. In combination with a vessel E for containing liquid, a cylinder A for containing liquefied carbonic-acid gas, a gas-reservoir B, a conduit connecting the two, a pressure-regulating valve upon the reservoir B, a gas-conduit leading from the pressure-regulating valve into the base of the vessel E, an exhaust-pump C, a gas-conduit leading from the top of the vessel E to the pump, and a conduit, including a gas-purifier D, leading from the discharge side of the pump into the reservoir B, the conduits having valves, substantially as described.

OTTO ZWIETUSCH.

In presence of—
J. W. DYRENFORTH,
M. J. FROST.